United States Patent
Bernstein et al.

(10) Patent No.: US 9,785,723 B2
(45) Date of Patent: Oct. 10, 2017

(54) METHODS FOR DYNAMIC DOCUMENT GENERATION

(71) Applicant: Facebook, Inc., Menlo Park, CA (US)

(72) Inventors: Keith Bernstein, San Francisco, CA (US); Robert Kieffer, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/586,743

(22) Filed: Dec. 30, 2014

(65) Prior Publication Data

US 2015/0205883 A1    Jul. 23, 2015
US 2016/0078145 A9    Mar. 17, 2016

Related U.S. Application Data

(63) Continuation of application No. 14/586,615, filed on Dec. 30, 2014, which is a continuation of application
(Continued)

(51) Int. Cl.
*G06F 17/00* (2006.01)
*G06F 17/30* (2006.01)
(Continued)

(52) U.S. Cl.
CPC ........ *G06F 17/30896* (2013.01); *G06F 8/427* (2013.01); *G06F 17/21* (2013.01);
(Continued)

(58) Field of Classification Search
CPC .......... G06F 17/3089; G06F 17/30896; G06F 17/2241; G06F 17/248; G06F 17/272
See application file for complete search history.

(56) References Cited

U.S. PATENT DOCUMENTS 5,552,982 A * 9/1996 Jackson ................ G06F 17/245
715/210
5,572,643 A 11/1996 Judson
(Continued)

OTHER PUBLICATIONS

U.S. Appl. No. 13/619,262, filed Sep. 14, 2012, Bernstein et al.
(Continued)

*Primary Examiner* — Laurie Ries
(74) *Attorney, Agent, or Firm* — Keller Jolley Preece

(57) ABSTRACT

Dynamic web page generation is optimized by reducing the processing overhead required to parse the web page HTML code for tokens and insert dynamic content. Using the invention, an HTML file for a dynamic web page need be read and parsed only once throughout the life of the server. A software object parses the HTML, decomposes the page into constituent pieces and saves them to data structures as byte streams, which are cached, along with the software object, rendering multiple disk accesses unnecessary when the page is reconstituted. For subsequent requests, the dynamic page is created from the cached version, which is shareable across users and across requests. The optimization reduces server resource usage for dynamic page generation to near zero. The invention is also applicable to other documents combining static and dynamic content that require composition tools for editing.

20 Claims, 4 Drawing Sheets

Related U.S. Application Data

No. 13/619,242, filed on Sep. 14, 2012, now abandoned, which is a continuation of application No. 12/719,354, filed on Mar. 8, 2010, now Pat. No. 8,402,368, which is a continuation of application No. 12/154,680, filed on May 23, 2008, now Pat. No. 7,703,010, which is a continuation of application No. 10/203,037, filed as application No. PCT/US01/03424 on Feb. 1, 2001, now Pat. No. 7,398,463, application No. 14/586,743, filed on Dec. 30, 2014, which is a continuation of application No. 13/619,242, filed on Sep. 14, 2012, now abandoned, which is a continuation of application No. 12/719,354, filed on Mar. 8, 2010, now Pat. No. 8,402,368, which is a continuation of application No. 12/154,680, filed on May 23, 2008, now Pat. No. 7,703,010, which is a continuation of application No. 10/203,037, filed as application No. PCT/US01/03424 on Feb. 1, 2001, now Pat. No. 7,398,463.

(60) Provisional application No. 60/180,394, filed on Feb. 4, 2000.

(51) Int. Cl.
 *G06F 9/45* (2006.01)
 *G06F 17/21* (2006.01)
 *G06F 17/22* (2006.01)
 *H04L 29/08* (2006.01)

(52) U.S. Cl.
 CPC ...... *G06F 17/2247* (2013.01); *G06F 17/3089* (2013.01); *G06F 17/30893* (2013.01); *G06F 17/30902* (2013.01); *H04L 67/1097* (2013.01)

(56) References Cited

U.S. PATENT DOCUMENTS

| | | | |
|---|---|---|---|
| 5,715,453 A | 2/1998 | Stewart | |
| 5,717,913 A | 2/1998 | Driscoll | |
| 5,761,673 A | 6/1998 | Bookman et al. | |
| 5,835,914 A | 11/1998 | Brim | |
| 5,894,554 A | 4/1999 | Lowery et al. | |
| 5,897,622 A | 4/1999 | Blinn et al. | |
| 5,933,606 A | 8/1999 | Mayhew | |
| 5,937,421 A | 8/1999 | Petrov et al. | |
| 5,968,125 A | 10/1999 | Garrick et al. | |
| 5,974,416 A | 10/1999 | Anand et al. | |
| 5,987,480 A * | 11/1999 | Donohue | G06Q 30/02 715/207 |
| 5,991,713 A | 11/1999 | Unger et al. | |
| 5,999,912 A | 12/1999 | Wodarz et al. | |
| 6,006,242 A | 12/1999 | Poole et al. | |
| 6,012,062 A | 1/2000 | Jagadish et al. | |
| 6,012,087 A | 1/2000 | Freivald et al. | |
| 6,018,748 A | 1/2000 | Smith | |
| 6,021,426 A | 2/2000 | Douglis et al. | |
| 6,023,724 A | 2/2000 | Bhatia et al. | |
| 6,025,844 A | 2/2000 | Parsons | |
| 6,038,598 A | 3/2000 | Danneels | |
| 6,055,522 A | 4/2000 | Krishna et al. | |
| 6,055,541 A | 4/2000 | Solecki et al. | |
| 6,112,206 A * | 8/2000 | Morris | G06F 8/60 |
| 6,112,242 A * | 8/2000 | Jois | G06F 17/3089 707/999.01 |
| 6,195,097 B1 | 2/2001 | Shrader et al. | |
| 6,216,212 B1 | 4/2001 | Challenger et al. | |
| 6,226,642 B1 | 5/2001 | Beranek et al. | |
| 6,230,168 B1 | 5/2001 | Unger et al. | |
| 6,230,173 B1 | 5/2001 | Ferrel et al. | |
| 6,278,449 B1 | 8/2001 | Sugiarto et al. | |
| 6,397,217 B1 | 5/2002 | Melbin | |
| 6,470,349 B1 | 10/2002 | Heninger et al. | |
| 6,480,893 B2 * | 11/2002 | Kriegsman | G06F 17/30067 709/226 |
| 6,505,242 B2 | 1/2003 | Holland et al. | |
| 6,539,370 B1 | 3/2003 | Chang et al. | |
| 6,549,944 B1 * | 4/2003 | Weinberg | G06F 11/32 707/E17.116 |
| 6,606,657 B1 * | 8/2003 | Zilberstein | G06F 11/3495 709/224 |
| 6,643,652 B2 * | 11/2003 | Helgeson | G06F 17/30569 |
| 6,658,624 B1 | 12/2003 | Savitzky et al. | |
| 6,671,853 B1 | 12/2003 | Burkett et al. | |
| 6,678,867 B2 | 1/2004 | Fong et al. | |
| 6,718,515 B1 | 4/2004 | Conner et al. | |
| 6,791,571 B1 * | 9/2004 | Lamb | G06F 17/211 345/619 |
| 6,886,130 B1 | 4/2005 | Unger et al. | |
| 6,966,027 B1 | 11/2005 | Krasinski | |
| 7,111,231 B1 | 9/2006 | Huck et al. | |
| 7,174,506 B1 * | 2/2007 | Dunsmoir | G06F 17/30899 707/E17.116 |
| 7,398,463 B2 | 7/2008 | Bernstein et al. | |
| 7,703,010 B2 | 4/2010 | Bernstein et al. | |
| 8,402,368 B2 | 3/2013 | Bernstein et al. | |
| 2001/0047294 A1 * | 11/2001 | Rothschild | G06Q 30/02 705/14.47 |
| 2002/0049788 A1 * | 4/2002 | Lipkin | G06F 17/30893 715/236 |
| 2004/0102197 A1 * | 5/2004 | Dietz | G06F 17/30893 455/456.1 |
| 2007/0118796 A1 * | 5/2007 | Nazem | G06F 17/2288 715/255 |
| 2013/0174000 A1 | 7/2013 | Bernstein et al. | |
| 2015/0113366 A1 | 4/2015 | Bernstein et al. | |

OTHER PUBLICATIONS

U.S. Appl. No. 13/619,287, filed Sep. 14, 2012, Bernstein et al.

Srinivasan, V., et al., "Fast Address Lookups Using Controlled Prefix Expansion", ACM Transaction on Computer Systems (TOCS), vol. 17, Issue 1, Feb. 1999, pp. 1-40.

Chang, Henry, et al., "Web Browsing in a Wireless Environment: Disconnected and Asynchronous Operation in ARTour Web Express", Proceedings of the 3rd Annual ACM/IEEE International Conference on Mobile Computing and Networking, Sep. 1997, pp. 260-269.

Fraternali, Piero, "Tools and Approaches for Developing Data-Intensive Web Applications: A Survey", ACM Computing Surveys (CSUR), vol. 31, Issue 3, Sep. 1999, pp. 227-263.

Si, Antonio, et al., "Maintaining Page Coherence for Dynamic HTML Pages", Proceedings of the 1998 ACM Symposium on Applied Computing, Feb. 1998, pp. 767-773.

"A Scalable System for Consistently Caching Dynamic Web Data", Jim Challenger et al., IEEE InfoCom, Mar. 1999.

"Main Memory Caching of Web Documents", Markatos, Evangelos, May 1996.

PCT International Preliminary Examination Report, PCT Application No. PCT/US01/03424, filed Feb. 1, 2001, 13 pages.

PCT International Search Report, PCT Application No. PCT/US01/03424, filed Feb. 1, 2001, 4 pages.

U.S. Appl. No. 10/203,037, dated Jan. 13, 2005, Office Action.
U.S. Appl. No. 10/203,037, dated Jun. 30, 2005, Office Action.
U.S. Appl. No. 10/203,037, dated Nov. 29, 2005, Office Action.
U.S. Appl. No. 10/203,037, dated May 10, 2006, Office Action.
U.S. Appl. No. 10/203,037, dated Oct. 13, 2006, Office Action.
U.S. Appl. No. 10/203,037, dated Mar. 21, 2007, Office Action.
U.S. Appl. No. 10/203,037, dated Aug. 17, 2007, Office Action.
U.S. Appl. No. 10/203,037, dated Feb. 20, 2008, Notice of Allowance.
U.S. Appl. No. 12/154,680, dated Aug. 17, 2009, Office Action.
U.S. Appl. No. 12/154,680, dated Dec. 3, 2009, Notice of Allowance.
U.S. Appl. No. 12/719,354, dated Feb. 10, 2012, Office Action.
U.S. Appl. No. 12/719,354, dated Jun. 19, 2012, Office Action.
U.S. Appl. No. 12/719,354, dated Jan. 2, 2013, Notice of Allowance.

(56) References Cited

OTHER PUBLICATIONS

U.S. Appl. No. 13/619,242, dated Aug. 6, 2014, Office Action.
U.S. Appl. No. 13/619,242, dated Mar. 19, 2015, Notice of Allowance.
U.S. Appl. No. 14/586,615, dated Mar. 21, 2017, Office Action.
U.S. Appl. No. 14/586,615, dated Jul. 28, 2017, Notice of Allowance.

* cited by examiner

METHODS FOR DYNAMIC DOCUMENT GENERATION

CROSS REFERENCE TO RELATED APPLICATIONS

This is a continuation of U.S. patent application Ser. No. 14/586,615, filed Dec. 30, 2014, which is a continuation of U.S. patent application Ser. No. 13/619,242, filed on Sep. 14, 2012, which is a continuation of U.S. patent application Ser. No. 12/719,354, filed on Mar. 8, 2010, now issued as U.S. Pat. No. 8,402,368, which is a continuation of U.S. patent application Ser. No. 12/154,680, filed May 23, 2008, now issued as U.S. Pat. No. 7,703,010, which is a continuation of U.S. patent application Ser. No. 10/203,037, filed Aug. 2, 2002, now issued as U.S. Pat. No. 7,398,463, which is a National Stage Entry of International Patent Application No. PCT/US01/03424, which claims priority from U.S. Provisional Application No. 60/180,394, filed Feb. 4, 2000, each of which is hereby incorporated by reference in their entirety.

COPYRIGHT NOTICE

A portion of the disclosure of this patent document contains material that is subject to copyright protection. The copyright owner has no objection to the reproduction by anyone of the patent document or the patent disclosure, as it appears in the Patent and Trademark Office file or records, but otherwise reserves all copyright rights whatsoever.

COMPUTER PROGRAM LISTING APPENDIX

A Computer Program Listing Appendix has been submitted electronically using the United States Patent Office EFS-Web system. The Computer Program Listing Appendix was submitted in a file entitled "ComputerProgramListingAppendix.txt," created Jun. 22, 2017, and consisting of 213,865 bytes of data. The Computer Program Listing Appendix is incorporated by reference in its entirety.

BACKGROUND OF THE INVENTION

Field of the Invention

The invention relates to processing of electronic documents. More particularly the invention relates to a method of optimizing generation of web pages having dynamic content.

Description of Related Technology

Today's Internet websites must deliver an ever-increasing amount of dynamic web page content. Dynamic web page generation is the process whereby a server computer creates HTML "on the fly" to send to a client computer (a Web browser). Dynamic web pages differ from static web pages in that the content of a dynamic web page can only be determined the moment a page request is received by the server computer. While a static web page might display a biography of Abraham Lincoln, content which can be created once and not changed anymore, such a web page and methodology would not be suitable for a web page which displayed the current price of oranges at five local supermarkets. The latter case requires that the server computer utilize dynamic information and compose that information into a web page to send to a client computer.

A common practice employed to aid in the creation of dynamic web pages is the use of HTML containing "tokens", or "tokenized HTML". A tokenized HTML file contains some never-changing static information, for example a page heading with the word "Welcome" in it, but also contains some dynamic or "live" areas; for example, an area after "Welcome" where the user's name is to be dynamically placed. This will allow each user to see a Web page that is customized for them. When Sally visits this web page she'll be greeted with a page title that says "Welcome Sally", and when Joe visits this web page it will be titled, "Welcome Joe". One of the major advantages of using tokens as placeholders for dynamic content is that they are extremely unobtrusive, allowing technical personnel such as programmers to make sure that dynamic content is placed in certain areas of the page without the necessity of embedding complicated source code in the HTML, which may be very confusing and distracting to someone such as a graphic designer, who is tasked with maximizing the page's aesthetic appeal.

To serve up dynamic web pages, a web server typically creates a dynamic page by loading up a static HTML page with a "token" or "placeholder" in the area where the user's name went. The tokens are of a known form, for example, "@UserName@," so that they may be searched for quickly and uniquely. The server searches the page looking for the tokens that refer to dynamic content, e.g. "@UserName@." Once the token has been located, the server replaces its text with the dynamically discovered text, e.g. "Sally." Replacing a token involves storing all of the text leading up to the token and concatenating it with the dynamic content and all of the text following the token. It must do this for each request it receives (each dynamic page that each user asks for).

Various methods of creating documents with varying content have been proposed. For example, J. Cooper, M. San Soucie, Method of generating document using tables storing pointers and indexes, U.S. Pat. No. 4,996,662 (Feb. 26, 1991) describe a document processing system having a system architecture that includes a control structure providing supervisory routines for controlling supervisory functions of the system and document manipulation routines for operating upon the documents.

R. Smith, D. Ting, J. Boer, M. Mendelssohn, Document management and production system, U.S. Pat. No. 5,181,162 (Jan. 19, 1993) disclose an object-oriented document management and production system in which documents are represented as collections of logical components that may be combined and physically mapped onto a page-by-page layout.

D. Dodge, S. Follett, A. Grecco, J. Tillman, Method and apparatus for document production using common document database, U.S. Pat. No. 5,655,130 (Aug. 5, 1997) describe a system and method for producing a variety of documents from a common document database. In the described system, source documents are decomposed into encapsulated data elements, in which a data element includes the actual content along with classifying data about the content. The encapsulated data elements are saved to a database, and can be later reassembled to form variation specific documents.

All of the systems described above involve the decomposition of source documents into smaller components, storing the document components in a database and reassembling the document components to form different variations of the source document, or completely new documents. While these systems facilitate the building of variation specific documents such as software documentation, and other engineering documents, they only involve combining and recombining static elements in various ways. The disclosed systems don't provide any way of generating a document "on the fly" that incorporates dynamically discovered information. Furthermore, none of the systems described concern themselves with optimizing the process of incorporating dynamic information into an online document by reducing the required computer resource usage.

Various other methods have been proposed for creating dynamic content in pages for delivery to a client over the Internet on the World-Wide Web (WWW). For example, JAVA SERVER PAGES from Sun Microsystems, Inc. of Menlo Park Calif. or ACTIVE SERVER PAGES from Microsoft Corporation of Redmond Wash. create all of the page content by having the page's Java or C++ server code write all of the page content to the client browser (the output stream). The major drawback of these solutions is that the server code and the page design (the HTML) are both contained in the same HTML file making it extremely difficult for non-programmers (e.g. graphic artists) to use popular page design tools to modify the content on these pages.

The primary task of Internet Web server computers is to deliver content (Web pages) to client computers (Web browsers). These server computers are expected to perform these operations extremely rapidly because they are being besieged by, potentially, thousands and thousands of client requests per second. For this reason web developers attempt to reduce bottlenecks in the server software so that the server is performing up to its maximum capacity. The problem, then, arrives when many tokens in many dynamic pages need to be repeatedly replaced with dynamic content. Though the example in the preceding paragraph only contained a single token, the reality is that dynamic Web pages are normally far more complex than in this example, and might have 20 or more tokens.

Without any optimization, on each request, the server would have to re-read the base HTML file from disk, search and replace all occurrences of each token, and then write the newly created content stream to the client's return stream. The problem with this approach is that it is extremely time consuming. Even if the file is read from disk only once (i.e. it's cached) the act of replacing all occurrences of all tokens in the file is a very slow and very costly operation. It is so slow that it would likely be the primary bottleneck in the server software. Additionally, buying more hardware, bandwidth, etc. will not solve this problem because no matter how many machines were running concurrently, on each client request each web server would have to re-read and re-replace the page's content.

There exists, therefore, a need in the art for a way to reduce the processing overhead required to parse the HTML code of a web page that requires the incorporation of dynamic content in order to locate areas, identified by tokens, wherein the dynamic contented is to be inserted, and replacing the tokens with the dynamic content.

SUMMARY OF THE INVENTION

The invention provides a process in which an HTML file for a web page incorporating dynamic content is read and parsed once and only once throughout the life of the server. The dynamic HTML file is read from the server's local disk. A ContentComposer, a software object, parses the HTML and decomposes the page into its constituent pieces, which are stored in multiple data structures. The data structures and the ContentComposer are cached, allowing extremely rapid access. For subsequent page requests, the dynamic page is created from the in-memory version. This in-memory version can be shared across users and across requests. Reading and decomposing the HTML file and performing token replacement is so highly optimized that server resource usage, (memory, CPU, etc.) is near zero.

While the preferred embodiment provides a particular implementation directed to replacement of tokens in HTML files by a web server, it is generally applicable to any situation in which documents need to be:
    editable using reasonable and current tools; and
    dynamic in that some of its content is static but other pieces of its content are created dynamically and will likely change from one creation to the next.

DETAILED DESCRIPTION

Overview

A description of the details and function of the present invention is provided below. The source code listed in APPENDIX A, written in JAVA, details the implementation of a preferred embodiment of the invention. The patentee has no objection to the reproduction of the source code or other information for the purpose of obtaining and maintaining a valid patent. However, the patentee otherwise reserves all copyright interests.

The invention is embodied as both a process to be executed on a computer, typically a web server, and a computer program product providing computer readable program code means for executing the various steps of the process. The computer readable program code is embodied on a computer readable medium. The computer readable medium may be either fixed, such as a mass storage device or a memory, or it may be removable, such as a CD or a diskette. The invention is implemented through the use of conventional computer programming techniques well known to those skilled in the art. While the source code provided in the attached appendix is written in JAVA, other programming languages would also be suitable for programming the invention. While the invention is preferably programmed in an object-oriented language such as JAVA or C++, other embodiments, consistent with the spirit and scope of the invention, programmed in procedural languages or scripted languages, are also possible.

Figure 1:
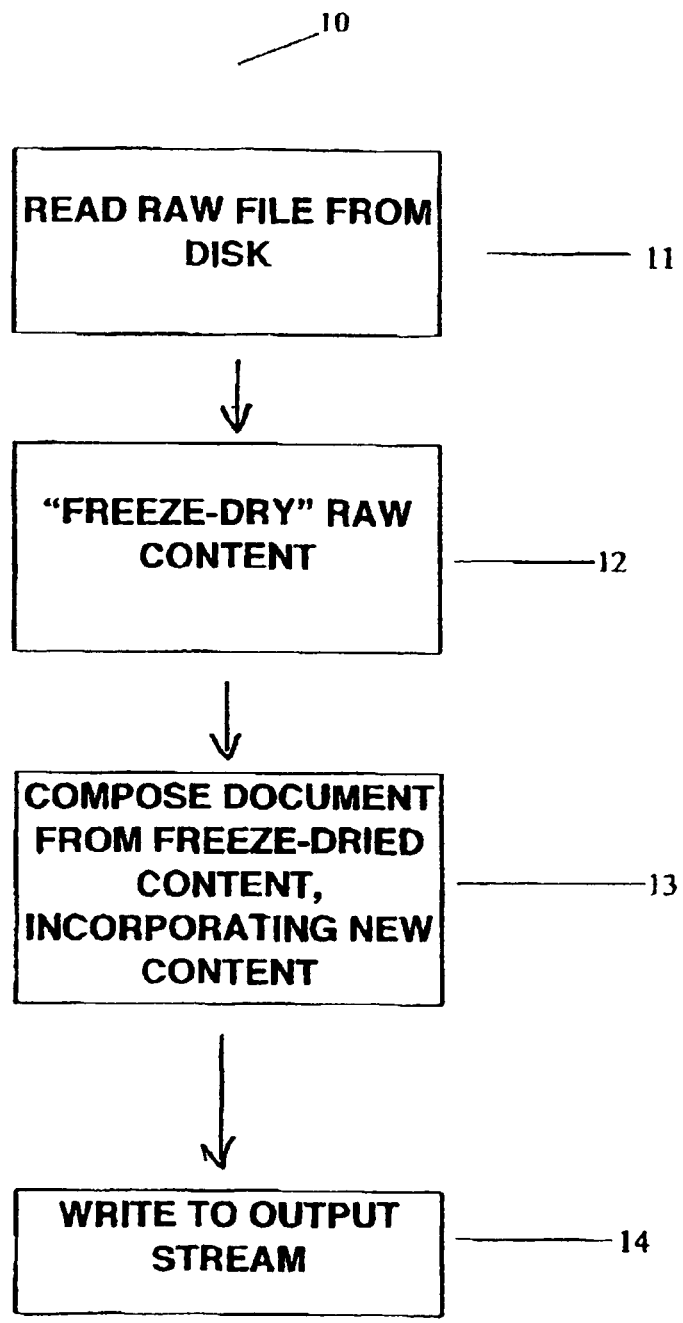
FIG. 1 provides a top-level block diagram of a process for optimizing generation of a computer readable document incorporating static and dynamic content, according to the invention.
Figure 2:
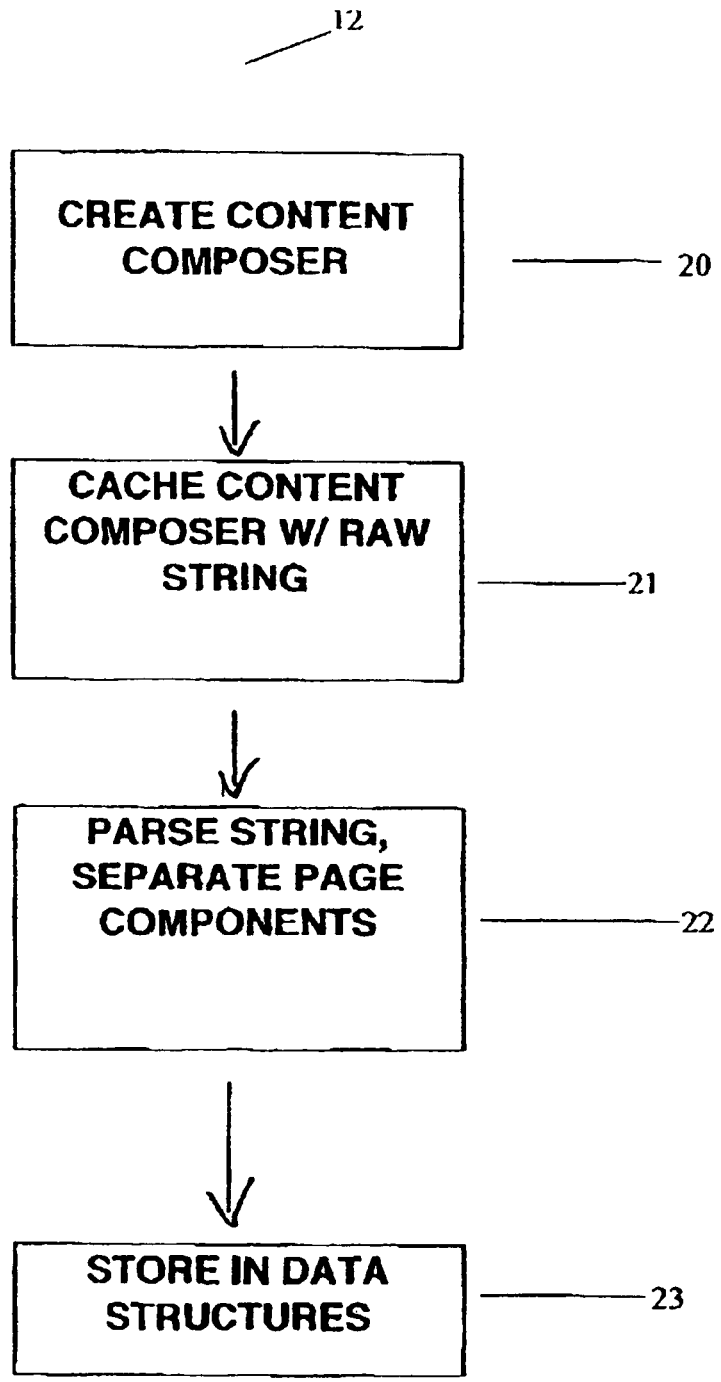
FIG. 2 provides a block diagram of a sub-process for "freeze-drying" raw content from a document template, according to the invention.
Figure 3:
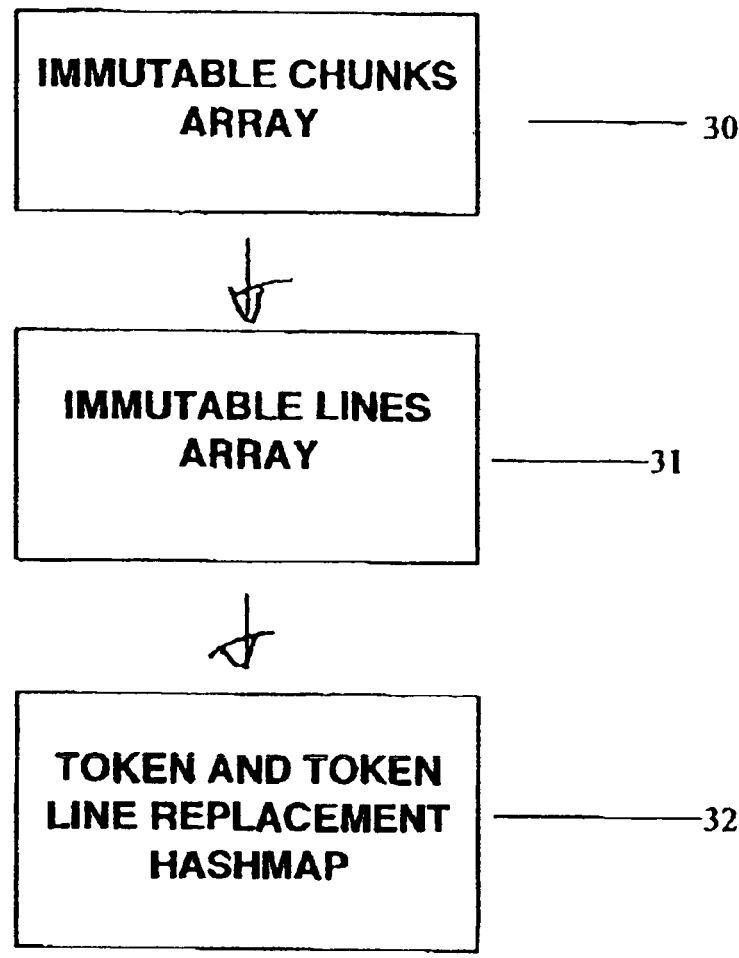
FIG. 3 provides a block diagram of a plurality of data structures for storing the freeze-dried content of FIG. 2, according to the invention.
Figure 4:
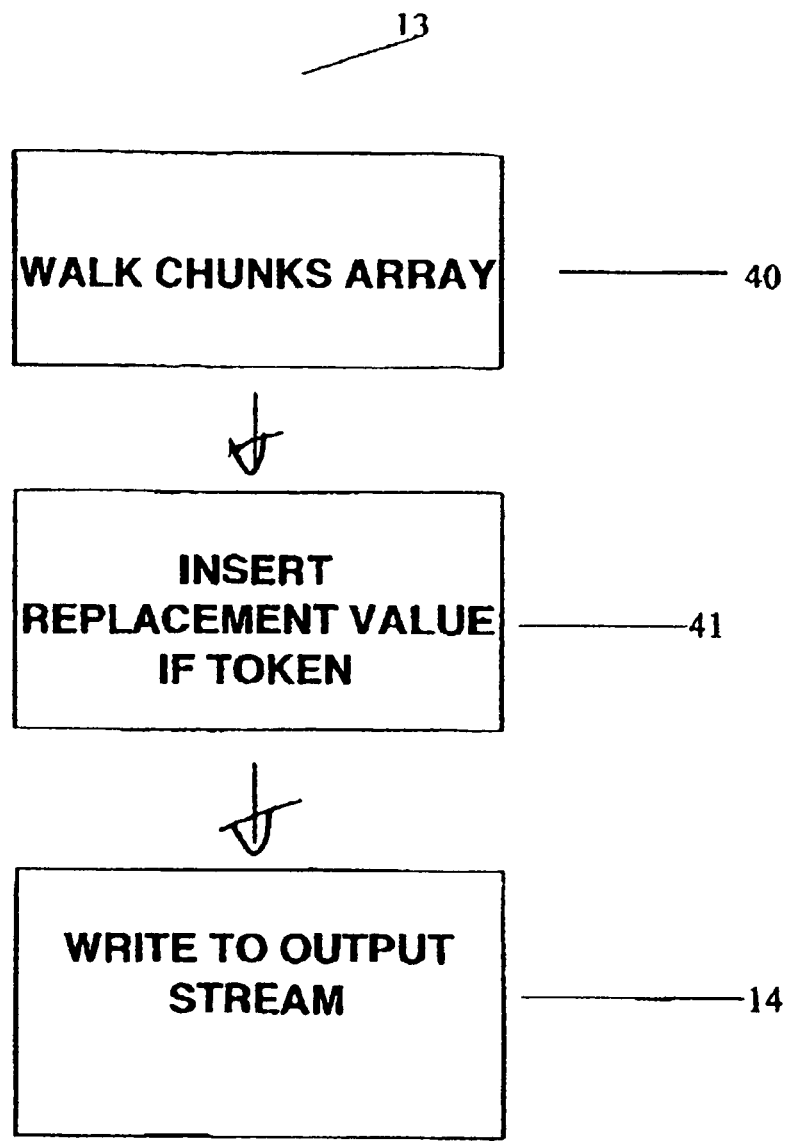
FIG. 4 provides a block diagram of a sub-process for composing a document from the freeze-dried content of FIG. 3, according to the invention.

Referring now to FIG. 1, the invention provides a process for optimizing generation of a computer readable document incorporating static and dynamic content 10, particularly web pages being served up to a client in response to a request from a user. As previously mentioned, one of the most common ways of generating web pages having dynamic content is to start with a page template. Typically, the page template is a file of HTML code containing placeholders where the dynamic content is to be inserted. The placeholders usually consist of tokens. For example, "@Username@" might be typically used as a placeholder for a user's name. When the template is created, or after it is edited, it is saved to disk, typically on a web server. Thereafter, the HTML file is read from the disk and parsed to locate the "live" or dynamic sections, which have been set off or reserved by the tokens. The invention provides a process in which the HTML file needs to be read from disk and parsed only once, unlike prior art methods, which require that the file be read and parsed every time a client requests the page.

File Reads

In the current embodiment of the invention, the HTML file is read from the disk 11 by means of a helper software object tasked with various utility file operations, such as reading in files, getting file lists and so on. Reading pages of "static" content is performed by a "getContent( )" method embodied in the helper object. The "getContent( )" method of the helper object retrieves the raw HTML file and stores the raw content to the cache as a string. More detailed descriptions of the operation of the helper object and the "getContent( )" method are to be found by referring to the documentation provided in the enclosed Appendix.

Content Composer

When parsing the HTML file for caching and token replacement purposes, the goal is to separate the HTML file into its component static pieces, dynamic pieces, and replaceable token pieces. A common term of art for this process is "freeze-drying" 12. The invention provides a ContentComposer class that is the sole parser and manager of this freeze-dried content. Each HTML file has a separate instance of the ContentComposer object associated with it. In keeping with conventional methods of object-oriented programming, in which an object includes both instructions and the associated data, the ContentComposer object for a particular page includes the implementation logic and the raw content string. When a file is loaded, the helper object checks to see if a ContentComposer object exists for the file. If the file has no associated ContentComposer object, the helper object creates one 20. A global HashMap, held in the cache, provides storage for ContentComposer objects. Thus, following creation of the ContentComposer, the new ContentCompser object is stored to the global Hashmap. In this way, the deconstructed file data is effectively cached, so that it may be used on subsequent invocations 21.

After being cached, ContentComposer parses the HTML file by "decomposing" the raw code string, separating it into its various components 22. Components are one of three types:

blocks of immutable content containing no tokens;
lines of immutable content that surround tokens; and
token replacement values.

According to a preferred embodiment of the invention, a token comprises a string that starts and ends with the "@" characters and contains no embedded white space, newline characters, colons, semi-colons, or commas. However, the delimiting characters are a mere matter of choice, dictated in this case by the conventional manner of creating tokenized HTML code.

In some cases, only the token is replaced, in other cases, the entire line containing the token is replaced. For example, the method allows calling processes to replace the whole line of text that the token was on, which is a frequent operation for callers replacing <li> or <select> items.

As previously described, the helper object provides a raw code string to the ContentComposer for parsing. A setContents( ) method within the ContentComposer provides most of the parsing logic for the invention. The setContents( ) method parses the raw content string to locate delimiting characters. Upon locating a delimiting character, the parsing engine evaluates the string for the presence of the previously indicated illegal characters—white space, newline characters, colons, semi-colons, or commas. The presence of any illegal characters indicates that the delimiting character is not associated with a valid token. "@foo bar@" or "keith@iamaze.com" are examples of such invalid strings. As the various page components are identified, they are stored to one of several data objects that are also associated with the ContentComposer. After the page components are identified, the page is decomposed by saving the separate components to a plurality of data structures 23. These data structures are described in greater detail below. It should be noted that the process of separating the page into components and storing them in the data structures constitutes the process commonly known as "freeze-drying." While, for the purpose of description, the data and the data structures are described separately from the logic and instructions, they are, in fact, all associated within a single ContentComposer object, which is held in the cache. Thus, as with the raw code string, the data structures containing the page components are effectively cached, eliminating the necessity of any further disk accesses when the HTML file is composed.

After the page components are cached, calling processes can ask the ContentComposer to perform token replacement, which it can do very fast: in 0-1 time, the tokens are stored in a HashMap as described below. The final part of SXContentComposer's lifecycle is when the caller asks the ContentComposer to "compose( )" itself, thus creating a page for download to a client 13. The compose( ) method itself provides additional important performance gains. Rather than recomposing the HTML into a string, and passing the string to the calling process, extremely wasteful of memory and processor time, the ContentComposer walks through the data structures and writes the data to an output stream as it is walking 14.

This implementation holds three primary data structures. It is necessary to hold this parsed data in three disparate, but linked, data structures because the data must be accessed from a number of different "angles", and for a number of different purposes. The composer will need access to all the original static text, plus some way to gather the token replacement values. The caller will need to replace token values (by specifying the token name), or the whole line the token appears on. The caller may also want to inspect the line a token appears on.

Data Structures

The three primary data structures are as follows:

The first is an array of immutable content broken up into "chunks" 30. Each chunk is either a text block with no "@foo@" tokens, or it is an integer object pointing to the index of a token replacement object, (SXTokenLine) which will supply the values (string) for that chunk.

The second data structure is also an array of immutable content: an array of the token-replacement-objects mentioned above 31, and pointed to by the chunks array. These token-replacement-objects are of type Token Line and they hold the static text that immediately precedes and follows a token. They also hold the raw token name itself (e.g. "@FooBar@") as well as a pointer to an object stored within the third data structure, a structure that holds the replacement line or replacement value associated with this token. This final object is of type Token. While the names assigned to the various page component types in the current embodiment are descriptive of their content, they are primarily a matter of choice.

The third data structure is a HashMap with all the tokens from the raw content as keys and all the replacement values set by the calling process as the values 32. These replacement values are of type Token Object, which can hold a replacement line or a replacement value for a token.

Note that the immutable text chunks never change throughout the life of this object, while the values stored in the tokens and replacement values HashMap are likely to change every time content is created, since tokens and replacement values represent the dynamic portion of the content.

Furthermore, to reduce the overhead of future writes to streams, and to reduce the excessive creation of string objects, the static data in both the immutable text chunks array as well as the immutable token lines array is stored as byte( ) rather than string.

Compose( ) Method

The Compose( ) method of the ContentComposer writes each text chunk and token replacement value to an output stream in sequential order, creating a single, coherent, token-replaced text stream.

As the ContentComposer walks the immutable text chunks array 40, if it encounters an array entry that is a token rather than a chunk of text, instead of concatenating the actual token, it concatenates the value for the token found in the tokens and replacement values HashMap 41.

The specific process and data structures used by the ContentComposer are described in greater detail in the example provided below.

Example

Sample Raw Content:

```
<html>
<title> iAmaze Presentation Tool </title>
<hl> Welcome to iAmaze, @UserName@! </hl>
<br>
<br>
Would you like to work on the presentation you last worked on, named
@LastPresentation@?
<br>
If so, click here.
</html>
```

Sample Raw Data Structures Created from Raw Content:
Immutable Text Chunks Array:

```
immutableTextChunksArray[0] = "<html>
              <title>iAmaze Presentation Tool </title>"
immutableTextChunksArray[1] = "new integer(0)"(use to look up, at
index=0, this token's pre- & post- SXTokenLine line text objects in the
"immutableTokenLines" array.)
immutableTextChunksArray[2] = "! </hl>
<br>
<br>"
immutableTextChunksArray[3] = "new Integer (1) "(index into
"immutableTokenlLines" array, above and below)
immutableTextChunksArray[4] = " ?
<br>
If so, click-here. </html> "
```

Immutable Token Lines Array:

```
ImmutableTokenLinesArray[0] = {SXTokenLine{prefix=
"<hi>Welcome to iAmaze, " suffix="! </hl>" , pointer to SXToken
object in the tokensAndReplacementValues}
```

```
ImmutableTokenLinesArray[1] = {SXTokenLine{prefix= "Would you
like to work on the presentation you last worked on , named: ",
suffix=" " ,pointer to SXToken object in the
tokensAndReplacementValues}
```

Tokens and Replacement Values HashMap:

```
TokensAndReplacementValues={
    {"@UserName@",SXToken{replacementForToken=null,
        replacementForTokenLine=null}},
    {"@LastPresentation@", SXToken{replacementForToken=null,
        replacementForTokenLine==null}}}
```

Thus, the data structures for the example page appear as shown above immediately after the parsing or "freeze-dry" process. After being supplied values by calling process, for example, in response to a request from a user, two separate methods are called to replace the tokens with the new content:

After Calls to:

```
anSXContentComposer.replaceLineContainingToken("@UserName@","<
    hl> Welcome to work, Keith! </hl>");
anSXContentComposer.replaceToken("@LastPresentation@","1999
    Harleys");
```

The Tokens and Replacement Values HashMap Look as Below:

```
tokensAndReplacementValues=
{{"@UserName@ ",SXToken{replacementFortoken=null,
    replacementForTokenLine="<hl>Welcome  to  work,  Keith!
    </hl>"}},
{"@LastPresentation@", SXToken {replacementForToken =
    "1999Harleys", replacementForTokenLine=null}}}
```

The first call replaces the entire line containing the token. The second call replaces only the token. The immutable text chunks and the immutable token lines arrays remain the same, since they contain immutable data.

A call to SXContentComposer's Compose( ) or to String( ) methods generates the following:

```
<html>
<title> iAmaze Presentation Tool </title> <hl> Welcome to work, Keith!
</title> <br>
<br>
Would you like to work on the presentation you last worked on, named
1999 Harleys? <br>
If so, click here.
</html>
```

The toString( ) method outputs a string to the output stream in a fashion similar to the Compose( ) method. More detailed description of the toString( ) method as well as the replaceLineContainingToken( ), and replaceToken( ) methods is to be found below.

Although the invention has been described herein with reference to certain preferred embodiments, one skilled in the art will readily appreciate that other applications may be substituted without departing from the spirit and scope of the present invention. Accordingly, the invention should only be limited by the Claims included below.

The invention claimed is:

1. A computer-implemented method comprising:
generating, by one or more servers including at least one data storage device, a template for a web page, wherein the template includes at least one static content portion and at least one placeholder for at least one dynamic content portion comprising content based on information received from a client device;
storing, by the one or more servers, the at least one static content portion;
storing, by the one or more servers, the at least one placeholder for the at least one dynamic content portion in association with the stored at least one static content portion;
receiving, from the client device by the one or more servers, content corresponding to the at least one dynamic content portion; and
storing, by the one or more servers, the received content corresponding to the at least one dynamic content portion; and
mapping, by the one or more servers, the stored at least one placeholder to the received content corresponding to the at least one dynamic content portion.

2. The computer-implemented method of claim 1, wherein:
storing the at least one static content portion comprises storing the at least one static content portion in a first data structure;
storing the at least one placeholder for the at least one dynamic content portion comprises storing the at least one placeholder for the at least one dynamic content portion in a second data structure; and
storing the received content corresponding to the at least one dynamic content portion comprises storing the received content corresponding to the at least one dynamic content portion in a third data structure; and
mapping the stored at least one placeholder to the received content comprises mapping the stored at least one placeholder using the third data structure, wherein the third structure maps the stored at least one placeholder to the received content corresponding to the at least one dynamic content portion.

3. The computer-implemented method of claim 2, wherein:
the first data structure comprises a first array of immutable content containing at least one static content portion and at least one integer object associated with the at least one placeholder;
the second data structure comprises a second array of immutable content mapping the at least one integer object to at least one placeholder replacement object, the at least one placeholder replacement object comprising a raw placeholder name for the at least one placeholder; and
the third data structure maps the raw placeholder name to at least one replacement value based on the received content.

4. The computer-implemented method of claim 3, wherein the at least one dynamic content portion comprises the at least one placeholder and a text surrounding the at least one placeholder.

5. The computer-implemented method of claim 2, wherein the one or more servers includes a cache, and wherein the method further comprises storing the first data structure, the second data structure, and the third data structure in the cache of the one or more servers.

6. The computer-implemented method of claim 1, further comprising sending, by the one or more servers, data corresponding to the template for the web page to the client device.

7. The computer-implemented method of claim 1, wherein the at least one placeholder comprises a plurality of placeholders and the at least one dynamic content portion comprises a plurality of dynamic content portions.

8. A system comprising:
at least one processor; and
at least one non-transitory computer readable storage medium storing instructions that, when executed by the at least one processor, cause the system to:
generate a template for a web page, wherein the template includes at least one static content portion and at least one placeholder for at least one dynamic content portion comprising content based on information received from a client device;
store the at least one static content portion;
store the at least one placeholder for the at least one dynamic content portion in association with the stored at least one static content portion;
receive, from the client device, content corresponding to the at least one dynamic content portion;
store the received content corresponding to the at least one dynamic content portion; and
map the stored at least one placeholder to the received content corresponding to the at least one dynamic content portion.

9. The system of claim 8, wherein:
storing the at least one static content portion comprises storing the at least one static content portion in a first data structure;
storing the at least one placeholder for the at least one dynamic content portion comprises storing the at least one placeholder for the at least one dynamic content portion in a second data structure; and
storing the received content corresponding to the at least one dynamic content portion comprises storing the received content corresponding to the at least one dynamic content portion in a third data structure; and
mapping the stored at least one placeholder to the received content comprises mapping the stored at least one placeholder using the third data structure, wherein the third structure maps the stored at least one placeholder to the received content corresponding to the at least one dynamic content portion.

10. The system of claim 9, wherein:
the first data structure comprises a first array of immutable content containing at least one static content portion and at least one integer object associated with the at least one placeholder;
the second data structure comprises a second array of immutable content mapping the at least one integer object to at least one placeholder replacement object, the at least one placeholder replacement object comprising a raw placeholder name for the at least one placeholder; and
the third data structure maps the raw placeholder name to at least one replacement value based on the received content.

11. The system of claim 10, wherein the at least one dynamic content portion comprises the at least one placeholder and a text surrounding the at least one placeholder.

12. The system of claim 8, further comprising instructions that, when executed by the at least one processor, cause the system to send data corresponding to the template for the web page to the client device.

13. The system of claim 8, wherein the at least one placeholder comprises a plurality of placeholders and the at least one dynamic content portion comprises a plurality of dynamic content portions.

14. A non-transitory computer-readable medium storing instructions that, when executed by at least one processor, cause a computer system to:
   generate a template for a web page, wherein the template includes at least one static content portion and at least one placeholder for at least one dynamic content portion comprising content based on information received from a client device;
   store the at least one static content portion;
   store the at least one placeholder for the at least one dynamic content portion in association with the stored at least one static content portion;
   receive, from the client device, content corresponding to the at least one dynamic content portion; and
   store the received content corresponding to the at least one dynamic content portion; and
   map the stored at least one placeholder to the received content corresponding to the at least one dynamic content portion.

15. The non-transitory computer-readable medium of claim 14, wherein:
   storing the at least one static content portion comprises storing the at least one static content portion in a first data structure;
   storing the at least one placeholder for the at least one dynamic content portion comprises storing the at least one placeholder for the at least one dynamic content portion in a second data structure; and
   storing the received content corresponding to the at least one dynamic content portion comprises storing the received content corresponding to the at least one dynamic content portion in a third data structure; and
   mapping the stored at least one placeholder to the received content comprises mapping the stored at least one placeholder using the third data structure, wherein the third structure maps the stored at least one placeholder to the received content corresponding to the at least one dynamic content portion.

16. The non-transitory computer-readable medium of claim 15, wherein:
   the first data structure comprises a first array of immutable content containing at least one static content portion and at least one integer object associated with the at least one placeholder;
   the second data structure comprises a second array of immutable content mapping the at least one integer object to at least one placeholder replacement object, the at least one placeholder replacement object comprising a raw placeholder name for the at least one placeholder; and
   the third data structure maps the raw placeholder name to at least one replacement value based on the received content.

17. The non-transitory computer-readable medium of claim 15, wherein the computer system includes a cache, and further comprising instructions that, when executed by the at least one processor, cause the computer system to store the first data structure, the second data structure, and the third data structure in the cache of the computer system.

18. The non-transitory computer-readable medium of claim 14, further comprising instructions that, when executed by the at least one processor, cause the computer system to send data corresponding to the template for the web page to the client device.

19. The non-transitory computer-readable medium of claim 14, wherein the at least one placeholder comprises a plurality of placeholders and the at least one dynamic content portion comprises a plurality of dynamic content portions.

20. A process for optimizing generation of a computer readable document incorporating static and dynamic content, comprising the steps of:
   providing, by at least one processor, a template file of said document, said file resident on a non-transitory mass storage device of a first computer;
   reading said template into memory;
   creating, by the at least one processor, a content composer, said content composer comprising a first software object;
   parsing, by the at least one processor, said template by said content composer, said template including one or more portions of static content and one or more placeholders corresponding to one or more portions of dynamic content, said parsing comprising deconstructing the template in order to separate the one or more portions of static content and the one or more placeholders;
   decomposing said template into separate page components by said content composer;
   converting, by the at least one processor, said components into strings of computer readable code by said content composer;
   storing said strings to one or more data structures; and
   caching said data structures containing said page components.

* * * * *